(12) United States Patent
Liu et al.

(10) Patent No.: US 11,376,495 B2
(45) Date of Patent: Jul. 5, 2022

(54) OPERATING CONTROLLER AND TERMINAL DEVICE

(71) Applicants:BEIJING BOE OPTOELECTRONICS TECHNOLOGY CO., LTD., Beijing (CN); BOE TECHNOLOGY GROUP CO., LTD., Beijing (CN)

(72) Inventors: Dong Liu, Beijing (CN); Yanchao Zhang, Beijing (CN); Zhengxuan Lv, Beijing (CN); Chao Yu, Beijing (CN); Jiaqiang Wang, Beijing (CN); Dawei Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 311 days.

(21) Appl. No.: 16/611,087

(22) PCT Filed: May 9, 2019

(86) PCT No.: PCT/CN2019/086137
§ 371 (c)(1),
(2) Date: Nov. 5, 2019

(87) PCT Pub. No.: WO2019/228165
PCT Pub. Date: Dec. 5, 2019

(65) Prior Publication Data
US 2021/0339124 A1    Nov. 4, 2021

(30) Foreign Application Priority Data

May 29, 2018    (CN) .......................... 201810531596.6

(51) Int. Cl.
*A63F 13/24*    (2014.01)

(52) U.S. Cl.
CPC .................................... *A63F 13/24* (2014.09)

(58) Field of Classification Search
None
See application file for complete search history.

(56) References Cited

U.S. PATENT DOCUMENTS 4,366,355 A * 12/1982 Oelsch ................. H01H 13/705
  200/5 A
9,158,390 B2 * 10/2015 Petersen ................. G06F 3/033
(Continued)

FOREIGN PATENT DOCUMENTS

| CN | 202315276 U | 7/2012 |
| CN | 203001933 U | 6/2013 |

(Continued)

OTHER PUBLICATIONS

International Search Report and Written Opinion for Application No. PCT/CN2019/086137, dated Aug. 15, 2019, 11 Pages.

*Primary Examiner* — James S. McClellan
*Assistant Examiner* — Peter J Iannuzzi
(74) *Attorney, Agent, or Firm* — Brooks Kushman P.C.

(57) ABSTRACT

An operating controller and a terminal device are provided. The operating controller includes a controller housing and an adsorption structure. The controller housing includes a plurality of movable function buttons. The adsorption structure is arranged on the controller housing. At least one of the plurality of function buttons includes a button body and a button column. The button body includes a surface for operation and a back surface arranged opposite to the surface for operation. The back surface of the button body is connected to the button column, and the button column is linked with the button body, the button column includes a first end and a second end and a touch layer, the first end and the second end are arranged opposite to each other, the first end is connected to the button body, the second end is
(Continued)

provided with the touch layer formed by a material that is enabled to touch and control the touch screen.

15 Claims, 2 Drawing Sheets

(56) References Cited

U.S. PATENT DOCUMENTS

| | | | | |
|---|---|---|---|---|
| 9,164,595 | B2* | 10/2015 | Petersen | A63F 13/2145 |
| 9,411,467 | B2* | 8/2016 | Argiro | G06F 3/016 |
| 10,627,918 | B2* | 4/2020 | Fukumoto | G06F 3/0338 |
| 10,747,333 | B2* | 8/2020 | Ikeda | G06F 3/039 |
| 2006/0007179 | A1* | 1/2006 | Pihlaja | G06F 3/04886 |
| | | | | 345/173 |
| 2006/0256090 | A1* | 11/2006 | Huppi | A63F 13/02 |
| | | | | 345/173 |
| 2010/0079403 | A1* | 4/2010 | Lynch | H03K 17/962 |
| | | | | 345/174 |
| 2010/0110013 | A1* | 5/2010 | Li | A63F 13/00 |
| | | | | 345/169 |
| 2011/0157056 | A1* | 6/2011 | Karpfinger | G06F 3/0488 |
| | | | | 345/173 |
| 2012/0154285 | A1* | 6/2012 | Nagao | G06F 3/0219 |
| | | | | 345/168 |
| 2012/0169597 | A1* | 7/2012 | Liotta | G06F 3/0338 |
| | | | | 345/161 |
| 2013/0002571 | A1* | 1/2013 | Skinner | G06F 3/03547 |
| | | | | 345/173 |
| 2014/0049475 | A1* | 2/2014 | Argiro | G06F 3/0443 |
| | | | | 345/172 |
| 2014/0200081 | A1 | 7/2014 | Ying | |
| 2015/0261297 | A1* | 9/2015 | Quek | G06F 3/044 |
| | | | | 345/174 |

FOREIGN PATENT DOCUMENTS

| | | |
|---|---|---|
| CN | 204219752 U | 3/2015 |
| CN | 206773679 U | 12/2017 |
| CN | 207137339 U | 3/2018 |
| CN | 108404403 A | 8/2018 |
| CN | 208229375 U | 12/2018 |
| JP | 2017215779 A | 12/2017 |

* cited by examiner

OPERATING CONTROLLER AND TERMINAL DEVICE

CROSS-REFERENCE RELATED APPLICATIONS

This application is the U.S. national phase of PCT Application No. PCT/CN2019/086137 filed on May 9, 2019, which claims priority to Chinese Patent Application No. 201810531596.6 filed on May 29, 2018, which are incorporated herein by reference in their entireties.

TECHNICAL FIELD

The present disclosure relates to the field of terminal device technology, in particular to an operating controller and a terminal device.

BACKGROUND

With the advancement of technology and the increasingly development and expansion of smartphones, mobile games have increasingly penetrated into people's entertainment life. For smart touch mobile devices, such as mobile phones or tablet computers, in a user interface (UI) design of game, direction buttons and the AB buttons and the like are located on a touch screen. When a player is playing a game, the game is operated through touching the touch screen by the player.

SUMMARY

An operating controller, including:
a controller housing, where the controller housing includes a plurality of movable function buttons, and
an adsorption structure, configured to adsorb and fix the controller housing on a touch screen, where the adsorption structure is arranged on the controller housing,
at least one of the plurality of function buttons includes a button body and a button column;
the button body includes a surface for operation and a back surface arranged opposite to the surface for operation;
the back surface of the button body is connected to the button column, and the button column is linked with the button body, the button column includes a first end and a second end opposite to each other and a touch layer, the first end is connected to the button body, the second end is provided with the touch layer formed by a material that is enabled to touch and control the touch screen.

In some embodiments of the present disclosure, the back surface of the button body includes a groove, the first end of the button column is accommodated in the groove, and the second end of the button column protrudes outside the groove.

In some embodiments of the present disclosure, the at least one function button further includes an elastic part configured to enable the button column to bounce and return in the case that a pressing force applied onto the button body is removed.

In some embodiments of the present disclosure, the elastic part includes a film which is elastically deformable, the film is arranged on the button column, and the film is configured to be pressed against the button column and the touch screen in the case that the controller housing is adsorbed on the touch screen.

In some embodiments of the present disclosure, the film is of a trumpet-like cylinder structure, the film includes a first opening end and a second opening end, an opening area of the first opening end is smaller than an opening area of the second opening end; the first opening end is arranged to sleeve on an outer circumference surface of the button column, the second opening end faces to the touch screen; the second end of the button column is accommodated in the trumpet-like cylinder structure in the case that the pressing force applied onto the button body is removed; and the second end is spaced apart from an edge of the second opening end by a predetermined distance.

In some embodiments of the present disclosure, the adsorption structure includes a plurality of suction cups arranged on a back surface of the button body.

In some embodiments of the present disclosure, the plurality of function buttons includes a plurality of button columns, and each button column corresponding to one of the plurality of suction cups.

In some embodiments of the present disclosure, at least one of the suction cups is a of bowl-like shape or a trumpet-like shape.

In some embodiments of the present disclosure, the operating controller further includes a limiting and fixing structure, where the button column is slidable in the groove, the limiting and fixing structure is arranged between the groove and the button column, and the limiting and fixing structure is configured to limit and fix the button column to a predetermined position in the groove.

In some embodiments of the present disclosure, the limiting and fixing structure includes a fixing rubber pad accommodated in the groove and sandwiched between the button column and an inner wall of the groove.

In some embodiments of the present disclosure, the operating controller further includes an analog stick, where the analog stick is arranged on the surface for operation.

In some embodiments of the present disclosure, the controller housing includes a button slot, and the button body is inserted in the button slot.

A terminal device, including a touch screen and the operating controller hereinabove.

BRIEF DESCRIPTION OF THE DRAWINGS

In order to more clearly illustrate the technical solutions of the embodiments of the present disclosure, the drawings to be used in the description of the embodiments of the present disclosure will be described briefly below. Obviously, the drawings in the following description are merely some embodiments of the present disclosure. For those skilled in the art, other drawings may also be obtained according to these drawings without the inventive labor.

DETAILED DESCRIPTION

Figure 1A:
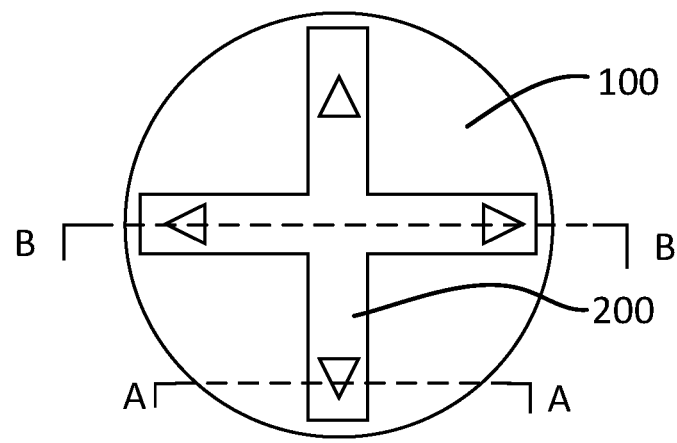
FIG. 1A is a schematic view of an operating controller in some embodiments of the present disclosure.
Figure 1B:
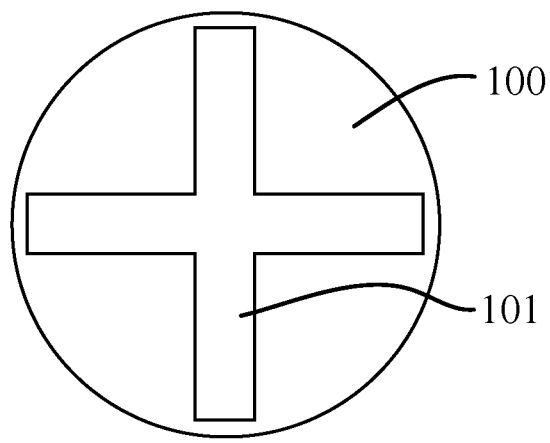
FIG. 1B is a schematic view of an operating controller in some embodiments of the present disclosure.

The technical solutions in the embodiments of the present disclosure will be described below in conjunction with the drawings in the embodiments of the present disclosure.

In a related art, when playing a game using a device including a touch screen, a touch operation may only be performed by touching the screen with a finger, so the touch feeling experience of users is poor, the entertainment and operability are reduced. In addition, from the player's point of view, touch functions in a smart touch mobile device is simple, and the button has no touch feeling experience, and it is difficult to implement the complex touch operations.

An operating controller and a terminal device are provided in the following embodiments of the present disclosure, where the operating controller is used to perform the touch operation on the touch screen, so as to improve a touch feeling experience of users.

As shown in FIGS. 1A to 3, the operating controller is provided in some embodiments of the present disclosure. In some embodiments, the operating controller is configured to perform the touch operation on the touch screen 10.

The operating controller includes a controller housing 100 and an adsorption structure 300, the controller housing 100 includes a function button 200.

The controller housing 100 is provided with a plurality of movable function buttons 200.

The adsorption structure 300 is arranged to adsorb and fix the controller housing 100 on the touch screen 10, and the adsorption structure 300 is arranged on the controller housing 100.

At least one function button 200 includes a button body 210 and a button column 220.

The button body 210 includes a surface for operation (for example, an operation surface touched by a user) and a back surface arranged opposite to the surface for operation.

The back surface of the button body 210 is connected with at least one button column 220, and the button column 220 is linked with the button body 210. When the user operates the button body 210, the button column 220 may perform a corresponding button motion. The button column 220 includes a first end, a second end and a touch layer 221, the first end and the second end are arranged opposite to each other, the first end is connected to the button body 210, the second end includes the touch layer 221 formed by a material that is enabled to touch the touch screen 10.

In the technical solution as described above, the operating controller is adsorbed and fixed on the touch screen 10 through the adsorption structure 300. The function button 200 includes the touch column 220, the touch layer 221 is arranged on the touch column 220. The touch layer 221 is made of a material capable of touching and controlling the touch screen 10. Therefore, in the case that the user operates the function button 200 (for example, in the case that the user presses the function button 200), the touch layer 221 arranged on the button column 220 included in the function button 200 touches the touch screen 10, so that a button operation is achieved.

Compared with the manner in which the user operates a game or the like by touching a screen of the touch screen 10 in the related art, since the user may directly operate the operating controller instead of touching the touch screen 10, an entertainment experience of using an actual controller in a mobile game may be achieved, and the implementation is simple and quick, thereby improving the entertainment and operability of the mobile game.

In some embodiments of the present disclosure, the operating controller is a gamepad. The function button 200 is a direction button or an A/B button.

In some embodiments of the present disclosure, the button on the operating controller is a press-type button.

In some embodiments, the button on the operating controller is an analog stick-type button.

In the following embodiments, taking an example that the function button 200 is the press-type button, a structure on the operating controller is exemplarily described.

In some embodiments, the button body 210 of the function button 200 is made of a material such as plastic or rubber. The button body 210 of the function button 200 may be moved relative to the controller housing 100, so as to enable the user to operate the function button 200.

In some embodiments of the present disclosure, as shown in FIG. 1A, the controller housing 100 and the button body 210 are arranged independently. The controller housing 100 includes a button slot 10. The button slot is arranged on the controller housing 100. The button body 210 of the function button 200 is inserted in the button slot. In the case that the user presses the button body 210, the button body 210 is moved relative to the controller housing 100 and pressed down; in the case that the user removes the pressing force, the button body 210 returns.

In some embodiments of the present disclosure, the button body 210 of the function button 200 is an elastic rubber. The controller housing 100 is made of a hard material, and the controller housing 100 includes the button slot. The button slot is arranged on the controller housing 100. The button body 210 covers a position corresponding to the button slot and is formed integrally with the surface of the controller housing 100. In the case that the user presses the button body 210, the button body 210 is moved relative to the controller housing 100 and pressed down; in the case that the user removes the pressing force, the button body 210 returns.

In some embodiments of the present disclosure, the button column 220 is linked with the button body 210, that is, in the case that the button body 210 is pressed down, the button column 220 is pressed accordingly, so as to enable the touch layer 221 on the button column 220 to presses the touch screen 10; in the case that the button body 210 returns, the button column 220 and the button body 210 simultaneously return, and the touch layer 221 on the button column 220 no longer applies a pressure to the touch screen 10.

Exemplarily, as shown in FIGS. 1A to 3, the button body 210 includes a groove 211. The back surface of the button body 210 (i.e., a side surface of the button body 210 adjacent to the touch screen 10) is provided with the groove 211. The first end of the button column 220 is accommodated in the groove 211, and the second end of the button column 220 protrudes out of the groove 211. In the case that the button body 210 is pressed, the button body 210 moves on the controller housing 100 along the pressure direction to drive the button column 220 to press the touch screen 10.

According to the above embodiments, the groove 211 is arranged on a side surface of the button body 210 adjacent to the touch screen 10. The linking between the button body 210 and the button column 220 is achieved by inserting and fixing the button column 220 into the groove 211, so the structure is simple.

In some embodiments of the present disclosure, the button column 220 is slidable in the groove 211.

In some embodiments of the present disclosure, the button body includes a limiting and fixing structure. The limiting and fixing structure is arranged between the groove 211 and the button column 220. The limiting and fixing structure is configured to limit and fix the button column 220 to a predetermined position in the groove 211.

According to the above embodiments, the button column 220 is slidable in the groove 211 and is limited to any position in the groove 211 by the limiting and fixing structure. A position of the button column 220 may be appropriately adjusted according to the screen size of the touch screen 10 of different models, so as to facilitate using the operating controller that is adsorbed on the screen of the terminal device such as a mobile phone or a tablet computer.

Figure 2:
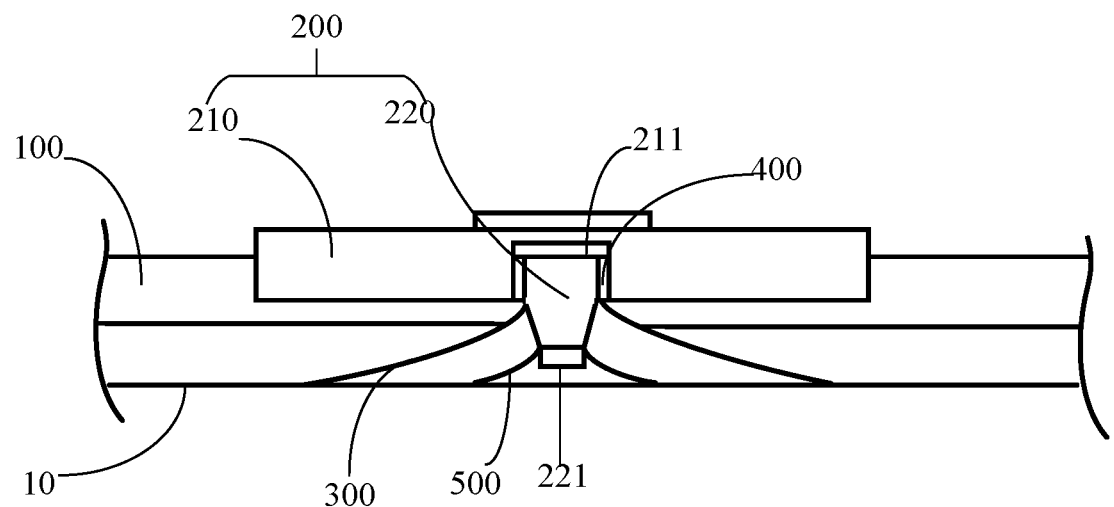
FIG. 2 is partial cross-sectional view taken along line A-A of FIG. 1A.
Figure 3:
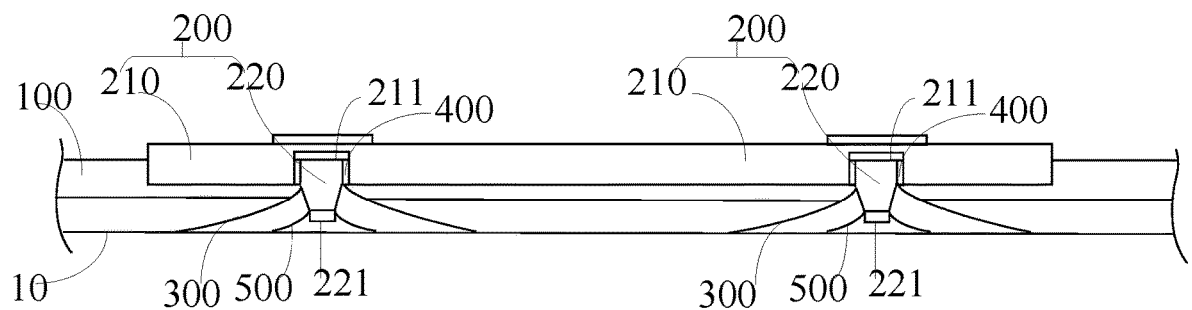
FIG. 3 is a partial cross-sectional view taken along line B-B of FIG. 1A.
Figure 4:
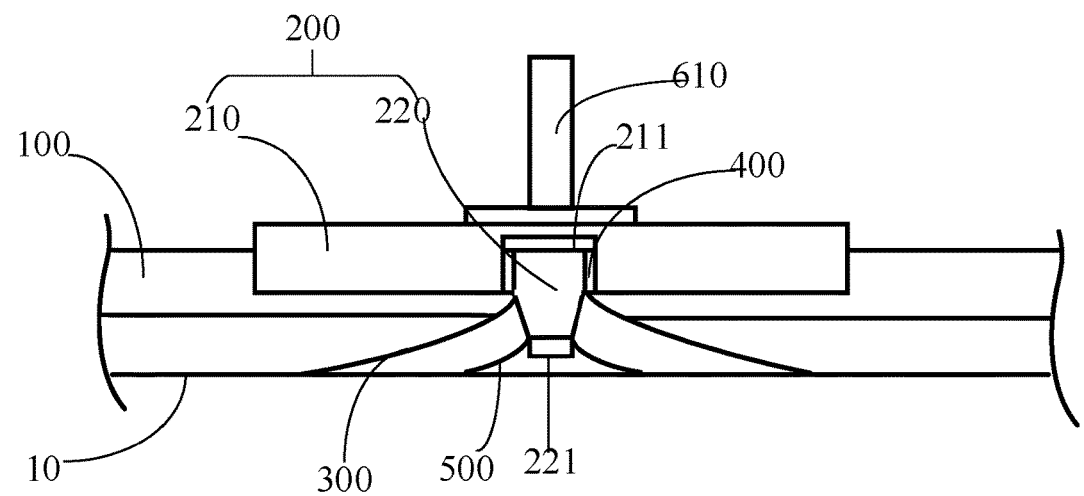
FIG. 4 is a schematic view of an analog stick button in an operating controller in some embodiment of the present disclosure.

In some embodiments of the present disclosure, as shown in FIGS. 2 to 4, the limiting and fixing structure includes a fixing rubber pad 400. The fixing rubber pad 400 is accommodated in the groove 211 and sandwiched between the button column 220 and an inner wall of the groove 211.

According to the above embodiments, the limiting and fixing structure is realized by the fixing rubber pad 400. The fixing rubber pad 400 is elastically deformable, accommodated in the groove 211 and sandwiched between the button column 220 and the inner wall of the groove 211. In the case that the position of the button column 220 is adjusted, the fixing rubber pad 400 is pinched and pressed, and the fixing rubber pad 400 may be elastically compressed and deformed, so that the button column 220 moves in the groove 211. In the case that the button column 220 is moved to the predetermined position, the fixing rubber pad 400 is loosened, so that the fixing rubber pad 400 is elastically expanded and deformed, so the fixing rubber pad 400 is pressed between the button column 220 and the inner wall of the groove 211, so as to fix and limit the button column 220, so that the button column 220 is fixed to any position in the groove 211 and may not slide freely.

It may be seen that, in the above solution, the groove 211 is used as a moving track of the button column 220, and the fixing rubber pad 400 is used to limit and fix the button column 220, so the structure is simple and the operation is convenient. Thus, the position of the button column 220 may be appropriately adjusted according to the screen size of the touch screen 10 of different models, thereby improving an applicability of the operating controller.

The button column 220 may also use other structures to adjust, limit and fix the position of the button column 220, which is not limited thereto.

The material of the fixing rubber pad 400 may be elastically deformed, for example, a rubber or a silicone may be used to make the fixing rubber pad 400.

In some embodiments, the function button 200 may be bounced and return in the case that the pressing force on the function button 200 is removed.

For example, as shown in FIG. 3, the function button 200 further includes an elastic part. In the case that a pressing force on the button body 210 is removed, the elastic part is configured to cause the button column 220 to bounce and return.

Exemplarily, as shown in FIGS. 2 to 4, the elastic part includes an elastically deformable film 500. The film 500 is arranged on the second end of the button column 220, and in the case that the controller housing 100 is adsorbed on the touch screen, the film 500 is arranged to be pressed against between the button column 220 and the touch screen 10.

According to the above embodiments, the elastic part is realized by the elastically deformable film 500. The film 500 is arranged on the button column 220. In the case that the user presses the function button 200, the button column 220 is pressed down with the button body 210, and the film 500 is elastically deformed. Thus the film 500 is pressed against between the button column 220 and the touch screen 10. In the case that the pressing force is removed by the user, the button column 220 bounces under an elastic force of the film 500, and the button body 210 returns. According to the above embodiments, the film 500 is used to elastically reset the function button 200, and the structure is simple, and the film 500 may not damage a surface of the touch screen 10.

In some embodiments of the present disclosure, as shown in FIGS. 2 to 4, the film 500 is a trumpet-like cylinder structure. The film 500 includes a first opening end and a second opening end. An opening area of the first opening end is smaller than an opening area of the second opening end; the first opening end is arranged to sleeve on an outer circumference surface of the button column 220; the second opening end faces to the touch screen 10; in the case that the pressing force is removed on the button body 210, the second end of the button column 220 is accommodated in the trumpet-like cylinder structure; and the second end is spaced apart from an edge of the second opening end by a predetermined distance.

According to the above solution, the film 500 is designed as the trumpet-like cylinder structure; a small opening of the trumpet (i.e., the first opening end) surrounds the outer circumference surface of the button column 220 to ensure that the forces applying to the periphery of the button column 220 are uniform. A large opening of the trumpet (i.e., the second opening end) faces to the touch screen 10 to ensure that the film 500 may smoothly bounce the button column 220. In addition, in the case that the pressing force is removed from the button body, the second end of the button column 220 is accommodated in the trumpet-like cylinder structure and spaced apart from the edge of the second opening end by a predetermined distance, thereby ensuring that the film 500 may smoothly bounce the button column 220.

In some embodiments of the present disclosure, the adsorption structure 300 includes a plurality of suction cups arranged on the side of the button body 210 adjacent to the adsorption structure 300.

According to the above embodiments, the adsorption structure 300 is configured to fix the operating controller on the touch screen 10 to ensure a touch accuracy. The adsorption structure 300 is implemented using the plurality of suction cups. The operating controller is adsorbed on the touch screen 10 through the suction cups, therefore the touch screen 10 may not be damaged, and the operation is convenient.

In some embodiments of the present disclosure, as shown in FIG. 3, the plurality of function buttons include the plurality of button column 220, and each button column 220 is correspondingly provided with one of the plurality of suction cups.

According to the above embodiments, since the button column 220 may be elastically moved up and down, each the button column 220 is provided with one suction cup to ensure that the entire operating controller is more firm and may not be displaced by the movement of the button column 220.

In some embodiments of the present disclosure, as shown in FIG. 2 and FIG. 3, the suction cups are of a bowl-like shape or a trumpet-like shape structure, and the suction cups are arranged around the outer circumference of the button column 220.

The suction cups have a suction force, so that the operating controller is absorbed and fixed to the touch screen 10 to ensure that the entire operating controller may not be displaced.

In some embodiments of the present disclosure, as shown in FIG. 4, the operating controller includes an analog stick 610. The analog stick 610 is arranged on the surface for operation of the button body 210 of at least one of the function buttons.

According to the above embodiments, the analog stick button is arranged in the operating controller. The analog stick button is implemented by arranging the analog stick 610 on the surface for operation of the button body of the function button. When the user operates the analog stick button, the analog stick 610 is pressed or pushed. Thus, the button body 210 performs a corresponding pressing motion, and drives the button column that is linked with the button body 210, so that the touch layer arranged on the button column is in contact with the touch screen 10, so as to touch and operate the touch screen 10.

A terminal device is provided in some embodiments of the present disclosure. The terminal device includes the touch screen 10 and the operating controller according to the embodiments of the present disclosure as described above.

The advantageous effects of the terminal device provided by the above embodiments of the present disclosure may reference to the benefits of the operating controller provided by any one of the embodiments as described above.

The advantage of the terminal device in the embodiments of the present disclosure hereinabove may refer to that of the operating controller in the embodiments of the present disclosure hereinabove.

The above description is merely some of the embodiments of the present disclosure, and any variation or substitution within the technical scope of the present disclosure may be easily conceived by those skilled in the art.

What is claimed is:

1. An operating controller, comprising:
a controller housing, wherein the controller housing comprises a plurality of movable function buttons, and
an adsorption structure, configured to adsorb and fix the controller housing on a touch screen, wherein the adsorption structure is arranged on the controller housing,
wherein at least one of the plurality of function buttons comprises a button body and a button column;
the button body comprises a surface for operation and a back surface arranged opposite to the surface for operation;
the back surface of the button body is connected to the button column, and the button column is linked with the button body, the button column comprises a first end and a second end opposite to each other and a touch layer, the first end is connected to the button body, the second end is provided with the touch layer formed by a material that is enabled to touch and control the touch screen,
wherein the back surface of the button body comprises a groove, the first end of the button column is accommodated in the groove, and the second end of the button column protrudes outside the groove.

2. The operating controller according to claim 1, wherein the at least one function button further comprises an elastic part configured to enable the button column to bounce and return in the case that a pressing force applied onto the button body is removed.

3. The operating controller according to claim 2, wherein the elastic part comprises a film which is elastically deformable, the film is arranged on the button column, and the film is configured to be pressed against the button column and the touch screen in the case that the controller housing is adsorbed on the touch screen.

4. The operating controller according to claim 3, wherein the film is of a trumpet cylinder structure, the film comprises a first opening end and a second opening end, an opening area of the first opening end is smaller than an opening area of the second opening end; the first opening end is arranged to sleeve on an outer circumference surface of the button column, the second opening end faces to the touch screen; the second end of the button column is accommodated in the trumpet cylinder structure in the case that the pressing force applied onto the button body is removed; and the second end is spaced apart from an edge of the second opening end by a predetermined distance.

5. The operating controller according to claim 1, wherein the adsorption structure comprises a plurality of suction cups arranged on a back surface of the button body.

6. The operating controller according to claim 5, wherein the plurality of function buttons comprises a plurality of button columns, and each button column corresponding to one of the plurality of suction cups.

7. The operating controller according to claim 6, wherein at least one of the suction cups is of a bowl shape or a trumpet shape.

8. The operating controller according to claim 1, further comprising a limiting and fixing structure, wherein the button column is slidable in the groove, the limiting and fixing structure is arranged between the groove and the button column, and the limiting and fixing structure is configured to limit and fix the button column to a predetermined position in the groove.

9. The operating controller according to claim 8, wherein the limiting and fixing structure comprises a fixing rubber pad accommodated in the groove and sandwiched between the button column and an inner wall of the groove.

10. The operating controller according to claim 1, further comprising an analog stick, wherein the analog stick is arranged on the surface for operation.

11. The operating controller according to claim 1, wherein the controller housing comprises a button slot, and the button body is inserted in the button slot.

12. A terminal device, comprising a touch screen and the operating controller according to claim 1.

13. An operating controller, comprising:
a controller housing, wherein the controller housing comprises a plurality of movable function buttons, and
an adsorption structure, configured to adsorb and fix the controller housing on a touch screen, wherein the adsorption structure is arranged on the controller housing,
wherein at least one of the plurality of function buttons comprises a button body and a button column;
the button body comprises a surface for operation and a back surface arranged opposite to the surface for operation;
the back surface of the button body is connected to the button column, and the button column is linked with the button body, the button column comprises a first end and a second end opposite to each other and a touch layer, the first end is connected to the button body, the second end is provided with the touch layer formed by a material that is enabled to touch and control the touch screen,
wherein the adsorption structure comprises a plurality of suction cups arranged on a back surface of the button body.

14. The operating controller according to claim 13, wherein
the plurality of function buttons comprises a plurality of button columns, and each button column corresponding to one of the plurality of suction cups.

15. The operating controller according to claim 14, wherein
at least one of the suction cups is of a bowl shape or a trumpet shape.

* * * * *